United States Patent Office 3,494,862
Patented Feb. 10, 1970

3,494,862
RECOVERY OF HYDROCARBON LIQUIDS
Carl Horowitz, Brooklyn, N.Y., assignor to Polymer Research Corporation of America, Brooklyn, N.Y.
No Drawing. Filed Jan. 21, 1969, Ser. No. 792,804
Int. Cl. B01d 15/00
U.S. Cl. 210—40                                                              6 Claims

ABSTRACT OF THE DISCLOSURE

A simplified method of recovering hydrocarbon liquids, as for example oil spills in machine shops, in the water, and in fact in almost any area. According to the invention the hydrocarbon liquid is contacted with porous polystyrene which completely absorbs the oil, and which can then be separated from the oil by heating whereupon the polystyrene melts and forms a liquid layer on bottom of the oil.

BACKGROUND OF THE INVENTION

The need for recovery of oil spills, for example on garage floors, machine shop floors and the like, has been known to exist for many years. In recent years there has been considerable publicity in connection with oil spills in the water, for example when large tankers carrying crude oil have split open and spilled their contents into the water. The crude oil could not be recovered from the water and washed up on the beach, killing marine life and ruining the neighboring beaches. Until the present there has been no feasible method for recovery of such oil spills.

SUMMARY OF THE INVENTION

Generally, speaking, in accordance with the present invention, porous polystyrene particles are contacted with the hydrocarbon liquid. These particles completely absorb the hydrocarbon liquid, e.g. oil, and in the case of an oil spill in water, the lumps of polystyrene containing the absorbed oil float on the surface of the water and can be easily scooped up. The lumps can then be separated into oil and polystyrene by heating. The polystyrene melts and forms a liquid layer on the bottom, with the oil layer floating on top. Consequently, it is not only possible to remove the danger of the oil spill, but it is actually possible to also recover the oil in usable form.

It is accordingly a primary object of the present invention to provide a method of recovering hydrocarbon liquids, and particularly oil spills.

It is another object of the present invention to provide a method of recovering oil spills in water by a procedure which permits the simple separation of the oil from the water and which also permits the subsequent recovery of the oil in usable form.

It is a further object of the present invention to provide a general method of recovering oil spills from all types of surfaces.

Other objects and advantages of the present invention will be apparent from a further reading of the specification and of the appended claims.

With the above and other objects in view, the present invention mainly comprises the method wherein the hydrocarbon liquids are contacted with porous polystyrene whereupon the liquid is absorbed by the polystyrene. In the case wherein the hydrocarbon liquid is in water, such as crude oil spilled in water, the polystyrene containing the absorbed hydrocarbon liquid floats on top of the water and can be easily scooped up and recovered. The oil can then be recovered therefrom by heating until the polystyrene melts whereupon two liquid layers are formed, the oil layer on top and the melted polystyrene layer on bottom so that the oil can be easily recovered.

DESCRIPTION OF PREFERRED EMBODIMENTS

The following examples are given to further illustrate the present invention. The scope of the invention is not, however, meant to be limited to the specific details thereof.

EXAMPLE 1

25 g. of bunker oil (heavy duty mineral oil) are dispersed in a beaker of water.

1 g. of expanded polystyrene spheres (Styrofoam) are placed on top of the above dispersion and stirred with a glass rod.

The oil is completely absorbed by the Styrofoam. It forms solid lumps which float on the surface and can be easily scooped up. The lumps can be separated into oil and polystyrene by heating. The polystyrene melts and forms a liquid layer on the bottom; the oil forms a layer on top.

The expanded polystyrene spheres used above can be obtained by heating Styrofoam pellets supplied by BASF Corp.

EXAMPLE 2

The same as Example 1 except that in place of expanded polystyrene spheres finely ground Styrofoam scrap obtained from coffee cups, packaging containers, packaging material and the like is used.

EXAMPLE 3

The same as Example 1 except that the Styrofoam pellets before expanding are sprayed with the following mixture:

| | |
|---|---:|
| Styrene monomer _____g__ | 50 |
| Water _____cc__ | 1000 |
| Ammonium persulfate _____g__ | 2 |
| Sodium lauryl sulfate detergent _____g__ | 5 |
| Sodium m-bisulfite _____g__ | 1 |
| Silver acetate _____g__ | 0.001 |

When heated the pellets expand with simultaneous formation of grafts or side chains of new polystyrene attached to the pellets.

When 1 g. of the above products is used it absorbs 100 g. of oil spilled on water a fourfold increase over Example 1. Other monomers such as acrylonitrile, methylmethacrylate or vinylacetate can be used in place of styrene monomer.

The above invention can be used to collect oil spilled on the sea water or in harbors from leaks in tankers or from tankers damaged by storms or other catastrophes.

EXAMPLE 4

The same as Example 1 except that sea water is used in place of plain water. 1 g. of Styrofoam absorbs 25 g. of oil dispersed in water. The remaining sea water is free from any oil.

EXAMPLE 5

The same as Example 1 except that salt water containing 3.5% sodium chloride is used. 1 g. of grafted expanded polystyrene absorbs 50 g. of spilled oil leaving the water completely clean.

In the Examples 1–5 a glass rod was used for stirring. On the ocean the agitation would be supplied by natural motion of the waves.

EXAMPLE 6

100 lbs. of heavy bunker oil was spilled in the Long Island Sound from a motor boat.

2 lbs. of grafted expanded polystyrene were spread on the surface of the oil. 5 minutes later the lumps of polystyrene oil agglomerates were collected with a fishing net.

After melting and recovering the oil was weighed. 99.5 lbs. oil was obtained indicating 99.5% recovery.

The above method and products can be used to recover oil spilled in machine shops, garages, oil fueled plants and boiler rooms.

EXAMPLE 7

5 g. of product of Example 3 was sprinkled on the floor of a machine shop on top of a large oil spot. A minute later it was swept up. A clean floor free of oil showed up.

Many other applications can be found such as recovery of spilled liquids other than oil (solvents for example), immobilizing of fuels in missiles (heating of the fuel tank would release the fuel oil). This latter application would greatly reduce the danger of fire due to spilled fuels.

While the invention has been described in particular in connection with the recovery of oil from various surfaces, and particularly from water, it will be understood that variations and modifications of the invention can be made without departing from the spirit or scope of this invention. Such variations and modifications are accordingly meant to be comprehended within the meaning and scope of equivalents of the appended claims.

What is claimed is:

1. Method of recovering hydrocarbon liquids, which comprises contacting a hydrocarbon liquid dispersed in water with porous bodies of a substance selected from the group consisting of polystyrene, copolymers of polystyrene and mixed polymers thereof, whereby said bodies absorb said hydrocarbon liquid and float on the surface of the water, removing said bodies containing absorbed hydrocarbon liquid from the water and heating the same until said bodies melt whereupon two liquid layers are formed, the hydrocarbon liquid layer floating on the other layer, whereby the layers can be separated and the hydrocarbon liquid recovered.

2. Method according to claim 1 wherein said bodies are of expanded polystyrene.

3. Method according to claim 1 wherein said bodies are of expanded polystyrene having grafted thereto a polymer selected from the group consisting of polyacrylonitrile, polymethylmethacrylate and polyvinylacetate.

4. Method according to claim 1 wherein said hydrocarbon liquid is oil.

5. Method according to claim 1 wherein said hydrocarbon liquid is oil which has been spilled into a body of water.

6. Method according to claim 5 wherein said water is sea water.

References Cited

UNITED STATES PATENTS

| | | | |
|---|---|---|---|
| 2,464,204 | 3/1949 | Baker | 210—40 X |
| 3,240,843 | 3/1966 | Nelson. | |
| 3,293,174 | 12/1966 | Robjohns. | |
| 3,334,042 | 8/1967 | Teitsma | 210—24 X |

FOREIGN PATENTS 666,990  11/1965  Belgium.

REUBEN FRIEDMAN, Primary Examiner

C. M. DITLOW, Assistant Examiner

U.S. Cl. X.R.

210—71, 502; 260—2.5

UNITED STATES PATENT OFFICE
CERTIFICATE OF CORRECTION

Patent No. 3,494,862                    Dated February 10, 1970

Inventor(s) Carl Horowitz

It is certified that error appears in the above-identified patent and that said Letters Patent are hereby corrected as shown below:

Column 2, line 11, delete "(Styrofoam)"
Column 2, line 14, change "Styrofoam" to --expanded polystyrene spheres--
Column 2, line 21, change "Styrofoam" to --expandable polystyrene--
Column 2, line 26 change "Styrofoam" to --polystyrene foam--
Column 2, line 31, change "Styrofoam" to --expandable polystyrene--
Column 2, line 56, change "Styrofoam" to --polystyrene foam--

Signed and sealed this 5th day of September 1972.

(SEAL)
Attest:

EDWARD M. FLETCHER, JR.            ROBERT GOTTSCHALK
Attesting Officer                  Commissioner of Patents